US007578881B2

(12) United States Patent
Ramme

(10) Patent No.: US 7,578,881 B2
(45) Date of Patent: Aug. 25, 2009

(54) ELECTRICALLY CONDUCTIVE CONCRETE AND CONTROLLED LOW STRENGTH MATERIALS HAVING SPENT CARBON SORBENT

(75) Inventor: Bruce W. Ramme, Okauchee, WI (US)

(73) Assignee: Wisconsin Electric Power Company, Milwaukee, WI (US)

( * ) Notice: Subject to any disclaimer, the term of this patent is extended or adjusted under 35 U.S.C. 154(b) by 623 days.

(21) Appl. No.: 11/402,452

(22) Filed: Apr. 12, 2006

(65) Prior Publication Data
US 2007/0240620 A1 Oct. 18, 2007

(51) Int. Cl.
C04B 18/08 (2006.01)
(52) U.S. Cl. ................. 106/705; 106/709; 106/711; 106/713; 106/DIG. 1
(58) Field of Classification Search .......... 106/644, 106/713, 707, 737, 705, DIG. 1, 709, 711
See application file for complete search history.

(56) References Cited

U.S. PATENT DOCUMENTS

| | | | |
|---|---|---|---|
| 3,573,427 A | 4/1971 | Minsk | |
| 3,962,142 A | 6/1976 | Freeman et al. | |
| 4,050,261 A | 9/1977 | Brewer et al. | |
| 4,116,705 A | 9/1978 | Chappell | |
| 4,125,410 A | 11/1978 | Natsuume | |
| 4,205,993 A | 6/1980 | Rosenberg et al. | |
| 4,210,457 A | 7/1980 | Dodson et al. | |
| 4,230,568 A * | 10/1980 | Chappell | 405/129.3 |
| 4,268,316 A | 5/1981 | Wills, Jr. | |
| 4,374,672 A | 2/1983 | Funston et al. | |
| 4,559,881 A | 12/1985 | Lankard et al. | |
| 4,731,120 A | 3/1988 | Tuutti | |
| 4,786,388 A | 11/1988 | Tatum, Jr. | |
| 5,026,508 A | 6/1991 | Tatum, Jr. et al. | |
| 5,032,181 A | 7/1991 | Chung | |
| 5,062,897 A | 11/1991 | Katsumata et al. | |
| 5,080,773 A | 1/1992 | Tatum, Jr. et al. | |
| 5,106,422 A | 4/1992 | Bennett et al. | |
| 5,294,255 A | 3/1994 | Smetana et al. | |
| 5,308,696 A | 5/1994 | Hanashita et al. | |
| 5,346,012 A | 9/1994 | Heathman et al. | |
| 5,346,547 A | 9/1994 | McCormack | |
| 5,366,600 A | 11/1994 | Westhof et al. | |
| 5,374,308 A | 12/1994 | Kirkpatrick et al. | |
| 5,447,564 A | 9/1995 | Xie et al. | |
| 5,490,889 A | 2/1996 | Kirkpatrick et al. | |
| 5,501,819 A | 3/1996 | Westhof et al. | |
| 5,520,730 A | 5/1996 | Barbour | |
| 5,652,058 A | 7/1997 | Nagata et al. | |
| 5,679,149 A | 10/1997 | Tezuka et al. | |
| 5,685,902 A | 11/1997 | Tezuka et al. | |
| 5,686,181 A | 11/1997 | Takano et al. | |
| 5,853,475 A | 12/1998 | Liskowitz et al. | |
| 5,855,663 A | 1/1999 | Takano et al. | |
| 5,908,584 A | 6/1999 | Bennett | |
| 5,951,751 A | 9/1999 | Williams et al. | |
| 6,461,424 B1 * | 10/2002 | Ramme et al. | 106/709 |
| 6,749,682 B2 | 6/2004 | Mattus | |
| 6,821,336 B1 * | 11/2004 | Ramme et al. | 106/709 |
| 2003/0200903 A1 | 10/2003 | Mattus | |
| 2004/0099982 A1 | 5/2004 | Sirola et al. | |

FOREIGN PATENT DOCUMENTS

EP 0 744 386 A1 11/1996
JP 06-287084 10/1994

OTHER PUBLICATIONS

CN 1130604 (Sep. 11, 1996) Wang Abstract only.*
CN 1282713 (Feb. 7, 2001) Wang Abstract only.*
American Concrete Institute Committee 229, "Controlled Low-Strength Materials", ACI 229R-99, pp. 229R-1 to 229R-15, Jun. 1999.
ASTM C 618-99, "Standard Specification for Fly Ash and Raw or Calcined Natural Pozzolan for Use as a Mineral Admixture in Portland Cement Concrete", Jul. 1999.
B. Ramme et al., "Construction Experience with CLSM Fly Ash Slurry for Underground Facilities", American Concrete Institute Special Pub. No. 153, Jun. 1995, pp. 1-11.
J.G. Cabrera et al., "Design and Properties of High-Volume Fly Ash High-Performance Concrete", American Concrete Institute, SP 186-2, p. 21-37, 1999.
A.G. Timms et al., "Use of Fly Ash in Concrete", American Society for Testing and Materials Proceedings, vol. 56, pp. 1139-1160, 1956.
R.E. Davis et al., "Weathering Resistance of Concretes Containing Fly-Ash Cements", Journal of the American Concrete Institute, vol. 12, pp. 281-293, 1941.
Machine translation of CN 1130604 issued on Nov. 11, 1996.
Machine translation of CN 1282713 issued on Feb. 7, 2001.

* cited by examiner

*Primary Examiner*—Paul Marcantoni
(74) *Attorney, Agent, or Firm*—Quarles & Brady, LLP

(57) ABSTRACT

Compositions are provided for increasing the electrical conductivity of concrete or controlled low-strength materials (flowable fill). One composition sets to produce a concrete and includes portland cement, water, aggregate, and particulate matter including a sorbent and a contaminant absorbed, adsorbed or entrapped by the sorbent. The sorbent may be activated carbon, and the contaminant may be mercury or a compound containing mercury. Another composition is a self-compacting, cementitious flowable fill composition that includes portland cement, water, and particulate matter including a sorbent and a contaminant absorbed, adsorbed or entrapped by the sorbent. The sorbent may activated carbon, and the contaminant may be mercury or a compound containing mercury. The compositions may also include carbon fibers.

22 Claims, No Drawings

ELECTRICALLY CONDUCTIVE CONCRETE AND CONTROLLED LOW STRENGTH MATERIALS HAVING SPENT CARBON SORBENT

CROSS-REFERENCES TO RELATED APPLICATIONS

Not Applicable.

STATEMENT REGARDING FEDERALLY SPONSORED RESEARCH

Not Applicable.

BACKGROUND OF THE INVENTION

1. Field of the Invention

This invention relates to concrete and controlled low-strength materials having increased electrical conductivity such that when used in construction, the material is capable of conducting electrical charges such as those resulting from a lightning strike. Further, the concrete and controlled low-strength materials include a spent carbon sorbent, thus providing a means for utilization of a product usually considered a waste product of coal burning power generation.

2. Description of the Related Art

It is known that fly ash can be incorporated into concrete. See, for example, U.S. Pat. Nos. 6,821,336, 6,461,424, 4,116,705, 4,268,316, 5,520,730, 5,853,475, 5,346,012, 5,490,889, 5,374,308, 4,230,568, 4,050,261 and 4,210,457; European patent application EP 744386; Davis et al., "Weathering Resistance of Concretes Containing Fly-Ash Cements", Journal of the ACI, vol. 12, pages 281-293, 1941; Timms et al., "Use of Fly Ash in Concrete", ASTM Proceedings, 1956; and Cabrera et al., "Design and Properties of High-Volume Fly Ash High-Performance Concrete", American Concrete Institute, SP 186-2, p. 21-37, 1999. In most of these patents and publications, the fly ash utilized comprises any of those fly ashes which meet the requirements of ASTM (American Society for Testing and Materials) C 618, "Standard Specification for Fly Ash and Raw or Calcined Natural Pozzolan for Use as a Mineral Admixture in Portland Cement Concrete."

It is also known that fly ash can be incorporated into controlled low-strength materials (often referred to as "CLSM"). In the publication "Controlled Low-Strength Materials", reported by American Concrete Institute Committee 229, June 1999, there is provided a description of controlled low-strength materials along with certain ingredient mixtures used to produce CLSM. Controlled low-strength materials are broadly defined in this publication as self-compacted, cementitious materials used primarily as a backfill in place of compacted fill. Conventional CLSM mixtures usually consist of water, portland cement, fly ash, and fine or coarse aggregates. Some CLSM mixtures consist of water, portland cement and fly ash. However, CLSM is not to be considered as a type of low-strength concrete. This publication also defines CLSM as a material that results in a compressive strength of 8.3 MPa (1200 psi) or less at the conventional 28 day testing period (typically without compaction), and notes that most current CLSM applications require unconfined compressive strengths of 2.1 MPa (300 psi) or less at the conventional 28 day testing period in order to allow future excavation. This publication makes reference to certain examples of CLSM mixtures which include fly ash. U.S. Pat. Nos. 6,821,336 and 6,461,424 disclose the use of fly ashes in controlled low-strength materials, and U.S. Pat. Nos. 5,951,751 and 4,374,672 disclose the use of fly ashes which meet the requirements of ASTM C 618 in controlled low-strength materials.

It is known that fly ash is a voluminous by-product of coal burning electrical power generation plants, presenting a possible environmental disposal issue. Thus, the above patents and publications can provide an economically advantageous means of beneficial utilization of the fly ash waste by-product.

Activated carbon sorbent materials are now beginning to be utilized to capture mercury from industrial and manufacturing processes. For example, coal fueled electric power generating units are being retrofitted with additional equipment to inject activated carbon sorbents into the combustion gases at various points to capture mercury. In some cases, the activated carbon is injected into existing electrostatic precipitators or baghouses that also collect fly ash. This results in a commingled spent sorbent/fly ash mixture. In other cases, an additional baghouse is installed after the primary fly ash particulate collection device for the injection of sorbent to capture mercury while preserving the existing fly ash quality for beneficial use such as the uses in concrete and CLSM described above. Examples of the collection of mercury using sorbents can be found in U.S. Pat. Nos. 6,521,021, 6,451,094, 5,854,173, 4,889,698 and 4,273,747.

The above mercury collection processes result in new by-products that consist of primarily spent activated carbon sorbent, small amounts of mercury, and ultra fine fly ash that gets past the primary fly ash particulate control device. As mercury controls are added to power plants and other industrial processes, the amount of spent sorbent is expected to grow and consume space in landfill facilities.

Air dried concrete is considered a reasonably good electrical insulator, having a resistivity on the order of $10^6$ ohm-cm, with oven dried concrete having a resistivity on the order of $10^{11}$ ohm-cm. Moist concrete, on the other hand is an electrolyte having a resistivity on the order of $10^4$ ohm-cm, which leads to its classification as a semiconductor. Since the transmission of electrical charge in moist concrete occurs through the movement of dissolved ions in the electrolytic solution, higher cement content and higher water content result in lower resistivity. High water content, however, is not acceptable for structural concrete, since it also results in lowered compressive strength and density. It has been found that there is a direct relationship between the degree of hydration of the cement paste and resistivity, yielding a linear relationship between resistivity and compressive strength of cement paste and concrete. That is, resistivity increases as the compressive strength increases.

Electrically conductive concrete may be produced by placing electrically conductive fibers and/or particles in close contact with each other so that a conductive network may be formed throughout the concrete. In conductive concrete, the transmission of electrical charge occurs mainly through the conductive additives, rather than through the electrolytic solution created in moist concrete. Such additives as carbon fibers, steel fibers, steel shavings, and carbon black have been found to be effective in modifying the conductivity of concrete into which they are blended. For example, U.S. Pat. No. 3,962,142 teaches the use of calcined oil coke and acetylene black aggregates in conductive concrete having satisfactory mechanical strength, while U.S. Pat. No. 5,908,584 teaches a mixture of graphite, amorphous carbon, and sand, comprising 25 to 75% of a cementitious composite useful for conducting floors, heating elements, and ground connectors.

Electrically conductive concrete and controlled low-strength materials would be advantageous where lowered electrical resistance may be sought, such as for use in structures where it is necessary to protect electrical equipment from lightning strikes. Accordingly, a means to reduce the electrical resistance of concrete or controlled low-strength materials, or to increase the conductivity thereof, is of interest in the building industry, for example. Further, since carbon sorbent materials are now beginning to become available as a waste product, and carbon is known to be highly conductive, the use of spent carbon sorbent as an additive to concrete or controlled low-strength materials to lower electrical resistance has now been investigated.

SUMMARY OF THE INVENTION

The need for concrete having increased electrical conductivity is met by a composition according to the invention that is capable of setting to produce electrically conductive concrete. The composition includes from about 1% to about 30% by weight of portland cement, from about 20% to about 90% by weight of an aggregate, from about 1% to about 30% by weight of particulate matter including a sorbent and a contaminant absorbed, adsorbed or entrapped by the sorbent, and water in a sufficient amount such that the composition sets to a concrete having a compressive strength of at least 8.3 MPa, wherein all weight percentages are percent by weight of the total composition.

In another aspect, the invention provides a method for preparing a composition capable of setting to produce a concrete having a compressive strength of at least 8.3 MPa. In the method, particulate matter comprising a sorbent and a contaminant absorbed, adsorbed or entrapped by the sorbent is included within the composition.

In yet another aspect, the invention satisfies the need for a controlled low-strength material having increased electrical conductivity. In this regard, the invention provides a self-compacting, cementitious flowable fill composition that includes from about 1% to about 30% by weight of portland cement, from about 20% to about 90% by weight of an aggregate, from about 1% to about 30% by weight of particulate matter including a sorbent and a contaminant absorbed, adsorbed or entrapped by the sorbent, and water in a sufficient amount such that the composition sets to a material having a compressive strength of 8.3 MPa or less, wherein all weight percentages are percent by weight of the total composition.

In another aspect, the invention provides a method for preparing a self-compacting, cementitious flowable fill composition capable of setting to produce a material having a compressive strength of 8.3 MPa or less. In the method, particulate matter comprising a sorbent and a contaminant absorbed, adsorbed or entrapped by the sorbent is included within the composition.

Thus, it is an advantage of the present invention to provide an inexpensive method for providing electrically conductive construction materials.

It is a further advantage to provide an economically advantageous means of beneficial utilization of a spent sorbent by-product.

It is another advantage to provide electrically conductive concrete that can be inexpensively manufactured, and to provide a dry concrete mixture that may be packaged for sale to the public for individual use by consumers wishing to provide an electrically conductive concrete structural element.

It is yet another advantage to provide a dry mix for a conductive concrete which can be inexpensively packed, delivered, mixed and used.

These and other features, aspects, and advantages of the present invention will become better understood upon consideration of the following detailed description and appended claims.

DETAILED DESCRIPTION OF THE INVENTION

The present invention is directed to concrete and controlled low-strength material having increased electrical conductivity. It has been discovered that controlled low-strength materials and concrete can be made less electrically resistant by the addition of spent carbon sorbent. The carbon and mercury in spent carbon sorbent can provide an electrical pathway throughout the concrete and controlled low-strength material for conduction of electricity, without a severe deleterious effect upon mechanical properties, such as compressive strength, thus permitting the use of the electrically conductive concrete and controlled low-strength materials in construction.

Electrical properties of concrete are of concern in some applications where inadequate resistivity of concrete affects electrical signaling systems, such as railway ties, or in structures in which concrete is used for protection from stray currents. Electrical properties of concrete are also of interest in such applications as cathodic protection of reinforced concrete; electrical grounding; deicing of airport runways, and bridge decks, by electrical heating; and non-destructive testing of concrete.

As is well known in the art, conventional concrete is a dense hard hydrated mass produced from mixtures of portland cement, coarse aggregate, fine aggregate, and water. Concrete mixtures generally use only sufficient water to make the mixture placeable and to yield hardened concrete having a compressive strength of at least 8.3 MPa (1200 psi) after 28 days. Portland cement is a well known cement that upon mixing with water binds or unites the other materials present in the mixture into concrete. The portland cement is typically a Type I, II, III, IV and V portland cement. The coarse aggregate conventionally comprises particles such as gravel, granite, limestone, shale, and the like. The fine aggregate employed in portland cement concretes is most often sand (silica) comprised of particles less than about 0.375 inches (9.5 millimeters) in size, typically equal to or less than about 0.1875 inches (4.76 millimeters) in size.

A concrete in accordance with the present invention is formed from a composition including portland cement, aggregate, water, and particulate matter including a sorbent and a contaminant absorbed, adsorbed or entrapped by the sorbent where the sorbent and/or contaminant provide an electrical pathway throughout the concrete for conduction of electricity, without a severe deleterious effect upon mechanical properties, such as compressive strength. One example embodiment of the invention is a composition capable of setting to produce a concrete wherein the composition includes from about 1% to about 30% by weight of portland cement, from about 20% to about 90% by weight of an aggregate, from about 1% to about 30% by weight of particulate matter including a sorbent and a contaminant absorbed, adsorbed or entrapped by the sorbent, and water in a sufficient amount such that the composition sets to a concrete having a compressive strength of at least 8.3 MPa, wherein all weight percentages are percent by weight of the total composition. The amount of portland cement, aggregate, water, and particulate matter including a sorbent can be varied in the above weight percentages depending on the physical properties desired in the concrete. Likewise, the composition of the portland cement, aggregate, and particulate matter including a sorbent can be varied depending on the physical properties desired in the concrete.

In one version, the composition according to the invention that is capable of setting to produce a concrete includes from about 1% to about 20% by weight of portland cement, from about 1% to about 20% by weight of an amount of fly ash having a carbon content as measured by loss on ignition of 6% or less, from about 40% to about 70% by weight of aggregate, and from about 1% to about 15% by weight of particulate matter including a sorbent and a contaminant absorbed, adsorbed or entrapped by the sorbent. The composition may further include from about 1% to about 30% by weight of fly ash having a carbon content as measured by loss on ignition of 6% or less, and/or from about 0.05% to about 10% by weight of carbon fibers. When using the term "carbon content", the carbon content is as measured by loss on ignition. The particulate matter with the sorbent may include fly ash. Preferably, the particulate matter has a carbon content as measured by loss on ignition of 20% or more, or most preferably 30% or more. Optionally, the composition according to the invention that is capable of setting to produce a concrete includes from about 1% to about 10% by weight of a water reducing admixture suitable for use in hydraulic cement compositions. Examples of such water reducing admixtures can be found in U.S. Pat. Nos. 4,205,993 and 4,125,410.

In one form, the sorbent is spent activated carbon having mercury contaminant and/or a contaminant compound containing mercury absorbed into, adsorbed on, or entrapped by the activated carbon. The use of spent sorbent having mercury may result in mercury being present in the particulate matter at a level equal to or greater than 2 parts per million by weight.

A composition according to the invention that is capable of setting to produce a concrete can produce, upon setting, a concrete having an electrical resisitivity of not more than 30,000 ohm-centimeters, preferably, not more than 10,000 ohm-centimeters, and most preferably, not more than 1,000 ohm-centimeters.

One specific embodiment of the invention is a composition capable of setting to produce a concrete wherein the composition includes from about 1% to about 20% by weight of portland cement, from about 1% to about 10% by weight of an amount of fly ash having a carbon content as measured by loss on ignition of 6% or less, from about 10% to about 45% by weight of aggregate comprising sand, from about 10% to about 45% by weight of a gravel aggregate, from about 1% to about 15% by weight of particulate matter including a sorbent and a contaminant absorbed, adsorbed or entrapped by the sorbent, and from about 0.05% to about 10% by weight of carbon fibers.

Thus, the invention provides a method for preparing a composition capable of setting to produce a concrete having a compressive strength of at least 8.3 MPa. In the method, particulate matter comprising a sorbent and a contaminant absorbed, adsorbed or entrapped by the sorbent is included within the composition. The spent sorbent can provide an electrical pathway throughout the concrete for conduction of electricity, without a severe deleterious effect upon mechanical properties, such as compressive strength, thus permitting the use of the electrically conductive concrete in construction.

A controlled low-strength material in accordance with the invention shares properties with both soils and concrete. The CLSM is prepared from materials (i.e., portland cement, water, optionally coarse aggregate, and optionally fine aggregate) similar to the concrete described above but also exhibits properties of soils. The specific properties of the CLSM depend on the ingredients in the mixture. The flowability of CLSM distinguishes it from other fill materials. Because of the flowability of the CLSM, the CLSM is self-leveling and self-compacting, i.e., the CLSM does not need conventional placing and compacting equipment. One version of a composition according to the invention for producing a CLSM in accordance with the present invention results in a CLSM having a compressive strength of 8.3 MPa (1200 psi) or less at the conventional 28 day testing period, while another version of a composition according to the invention produces a CLSM in accordance with the present invention that has unconfined compressive strengths of 2.1 MPa (300 psi) or less at the conventional 28 day testing period in order to allow future excavation.

One controlled low-strength material in accordance with the present invention is formed from a composition including portland cement, water, and spent sorbent that provide an electrical pathway throughout the controlled low-strength material for conduction of electricity, without a severe deleterious effect upon mechanical properties, such as compressive strength.

One example embodiment of the invention is a self-compacting, cementitious flowable fill composition capable of setting to produce a controlled low-strength material according to the present invention wherein the composition includes from about 1% to about 30% by weight of portland cement, from about 20% to about 90% by weight of an aggregate, from about 1% to about 30% by weight of particulate matter including a sorbent and a contaminant absorbed, adsorbed or entrapped by the sorbent, and water in a sufficient amount such that the composition sets to a material having a compressive strength of 8.3 MPa or less, wherein all weight percentages are percent by weight of the total composition. The amount of portland cement, water, and particulate matter including a sorbent can be varied in the above weight percentages depending on the physical properties desired in the controlled low-strength material. Likewise, the composition of the portland cement, aggregate, and particulate matter including a sorbent can be varied depending on the physical properties desired in the controlled low-strength material.

In one version, the self-compacting, cementitious flowable fill composition includes from about 1% to about 30% by weight of fly ash having a carbon content as measured by loss on ignition of 6% or less. The particulate matter may have a carbon content as measured by loss on ignition of 20% or more, or most preferably 30% or more. The composition may set to a material having a compressive strength of 2.1 MPa or less. The composition may set to a material having an electrical resistivity of not more than about 6000 ohm-centimeters. Preferably, the composition sets to a material having an electrical resistivity of not more than about 1000 ohm-centimeters. Most preferably, the composition sets to a material having an electrical resistivity of not more than about 500 ohm-centimeters.

In one form, the sorbent is spent activated carbon having mercury contaminant and/or a contaminant compound containing mercury absorbed into, adsorbed on, or entrapped by the activated carbon. The use of spent sorbent having mercury may result in mercury being present in the particulate matter at a level equal to or greater than 2 parts per million by weight.

One specific embodiment of the invention is a self-compacting, cementitious flowable fill composition that sets to a material having a compressive strength of 8.3 MPa or less. The composition includes from about 1% to about 20% by weight of portland cement, from about 1% to about 10% by weight of an amount of fly ash having a carbon content as measured by loss on ignition of 6% or less, from about 10% to about 65% by weight of aggregate comprising sand, from about 1% to about 40% by weight of particulate matter including a sorbent and a contaminant absorbed, adsorbed or entrapped by the sorbent, and from about 0.05% to about 10% by weight of carbon fibers, wherein all weight percentages are percent by weight of the total composition.

Thus, the invention provides a method for preparing a self-compacting, cementitious flowable fill composition capable of setting to produce a controlled low-strength material. In the method, particulate matter comprising a sorbent and a contaminant absorbed, adsorbed or entrapped by the sorbent is included within the composition. The spent sorbent can provide an electrical pathway throughout the controlled low-strength material for conduction of electricity, without a severe deleterious effect upon mechanical properties, such as compressive strength, thus permitting the use of the electrically conductive controlled low-strength material in construction.

A conductive concrete or controlled low-strength material produced in accordance with the present invention has many applications. For example, in one application, conductive concrete or controlled low-strength materials can be used as a substitute for materials which are used to absorb and ground various types of energy for military and other government applications. These uses may include absorption of direct energy, energy feedback and amplification, and EMP pulses. The conductive concrete or controlled low-strength materials would replace or supplement traditionally used grounding materials and be connected by grounding loops. Due to the engineering properties of the conductive concrete or controlled low-strength materials, the absorption should cover the entire energy range of the electromagnetic spectrum.

A conductive concrete or controlled low-strength material produced in accordance with the invention also would be beneficial when used in structures that may be struck by lightning. Lightning research photographs indicate that the initial lightning energy dissipates in 15 to 60 meter channels longitudinally across the surface of the earth. This is in contrast to the perception that all energy conducts into a finite earth point. The image appears similar to multiple lava flow channels emanating from a single volcano cone. Present buried grid systems not only do not prevent these phenomena, but may in fact enhance the effect. It suggests that earth's inability to absorb large energy transfer at a finite point within the extremely short time event contributes to dangerous and damaging voltage scenarios. Extremely high voltage gradients result in physical structure and electronic equipment failures and indicate the need for an improved conduction transfer media to couple lightning energy to the earth. A conductive concrete or controlled low-strength material produced in accordance with the invention: (1) provides for low inductance, low resistance and subsequently low impedance values for all frequencies up to 1 Mhz; (2) conducts energy efficiently across and through its surface without damage while providing true equalized ground potential rise values; (3) conducts energy efficiently into the earth quickly and seamlessly by providing the lowest impedance-coupling path; (4) provides for long term, high strength physical properties; and (5) is compatible with copper, aluminum and galvanized steel products. Specific applications include: (1) microwave, radio, and cellular sites; (2) electrical power and substation plants; (3) electric distribution poles; and (4) high tech building systems.

Microwave, radio, and cellular site towers risk lightning strikes. Using a conductive concrete or controlled low-strength material produced in accordance with the invention in footings and large pads reduces ground potential rise by lowering the impedance between the lightning stroke and the earth. The event duration may also decrease due to shorter energy transfer times. A conductive concrete or controlled low-strength material produced in accordance with the invention could replace the typical wood, metal or standard concrete enclosure. Enhanced protection and reduced electronic equipment damage is achieved through the reduction of unacceptable voltage gradients. Using a conductive concrete or controlled low-strength material produced in accordance with the invention in the radial ground system will enhance energy transfer away from the site. The entire design package reduces risk to site failures thus improving revenue through reduced maintenance. A conductive concrete or controlled low-strength material produced in accordance with the invention will contribute to improved lightning protection efficiency at microwave, radio, TV, and cellular tower sites. Presently, the sites rely on copper wire grounding designs to lower earth resistivity to conduct lightning contacts to ground while providing an equalized ground potential rise within the protected site area. However, voltage gradients continue to exist resulting in equipment and revenue losses.

Electrical power and substation plants require above grade facilities grounded to large buried ground grid systems. This provides for efficient electrical operation of equipment and safe low step and touch ground potentials for operating personnel. Using a conductive concrete or controlled low-strength material produced in accordance with the invention to replace or enhance foundations and buried ground grid systems allows for integral above and below grade ground connections that are efficient, low maintenance, easy to test and resilient to damage. A conductive concrete or controlled low-strength material produced in accordance with the invention would provide high conductance paths for low and high frequency current transfers. Applications requiring low earth resistance values that are difficult to achieve are a particularly attractive solution to achieve satisfactory earth resistance values.

State regulations require electric distribution pole lines to be grounded periodically. While the primary purpose is system protection, stabilization, and elimination of stray voltage problems, surge protection devices connect to the same ground system. This results in a high impedance path for lightning and transient energy conduction. Surrounding the direct buried wood or metal pole base with a conductive concrete or controlled low-strength material produced in accordance with the invention increases fault and lightning protection by providing a low impedance conduction path to earth. In addition, increasing the large contact area between a conductive concrete or controlled low-strength material produced in accordance with the invention and earth enhances conductance, reduces wood pole rot at the earth line, and expedites installation.

The proliferation of "high tech" voice and data systems applications is requiring grounding performance evaluations in commercial facilities. Plastic utility service conduits to commercial and residential facilities remove traditional sources for attaching main ground systems. This increases the risk of communication equipment downtime and damage due to electrical system aberrations and lightning. National standards are directing building designer's attention to providing efficient local ground systems such as external or incorporated grounding rings to replace inefficient ground systems. A conductive concrete or controlled low-strength material produced in accordance with the invention will complement designer's options by allowing building steel components to couple directly to earth via a conductive structural medium. The transfer of lightning energy, stabilized equipotential ground system and presence of an efficient signal reference ground will contribute to high communication performance and reliability.

One especially advantageous use of the present invention is in electrical grounding, or similar, applications. When electrical resistance of the materials is lowered, they will reduce the required length, or entirely replace, the grounding electrodes currently in use for protection of electrical equipment from lightning strikes.

The invention is further illustrated in the following Examples which are presented for purposes of illustration and not of limitation. Spent sorbent material was successfully used to produce conductive concrete and conductive controlled low strength material.

EXAMPLES

Materials utilized in the examples consisted of fly ash, cement, clean concrete sand, gravel aggregates, and a particulate material including fly ash and an activated carbon sorbent having adsorbed mercury.

Clean concrete sand was utilized as fine aggregate for the CLSM and concrete mixtures. The sand met ASTM C 33 requirements.

The coarse aggregate used for the project was natural river gravel with a maximum nominal size of ⅜ inch.

Type I Portland cement was used throughout this investigation.

The fly ash used for this project was obtained from We Energies, Pleasant Prairie Wisconsin Power Plant. It met the requirements of ASTM C 618, Class C.

The particulate material including fly ash and an activated carbon sorbent having adsorbed mercury was obtained from a coal fired electric generation facility that uses activated carbon sorbent to capture mercury. Tables 1, 2, 3 and 4 below show chemical analyses of the particulate material including fly ash and an activated carbon sorbent having adsorbed mercury.

TABLE 1

| Parameter | Result | MDL | Units | Analysis Method |
|---|---|---|---|---|
| Total Arsenic | 670 | 30 | ppm | EPA 7060A |
| Total Barium | 1300 | 1.3 | ppm | EPA 6010C |
| Total Beryllium | 5.5 | 0.22 | ppm | EPA 7091 |
| Total Boron | 320 | 0.34 | ppm | EPA 6010C |
| Total Cadmium | 2.8 | 0.40 | ppm | EPA 6010C |
| Total Chromium | 43 | 0.25 | ppm | EPA 6010C |
| Hexavalent Chromium | 2.2 | 0.64 | ppm | EPA 7196A |
| Total Cobalt | 24 | 0.77 | ppm | EPA 6010C |
| Total Copper | 170 | 0.21 | ppm | EPA 6010C |
| Total Lead | 61 | 3.0 | ppm | EPA 6010C |
| Total Manganese | 160 | 0.032 | ppm | EPA 6010C |
| Total Molybdenum | 50 | 1.2 | ppm | EPA 6010C |
| Total Nickel | 53 | 0.71 | ppm | EPA 6010C |
| Total Selenium | 2200 | 70 | ppm | EPA 7740 |
| Total Silver | 0.17 | 0.026 | ppm | EPA 7761 |
| Total Vanadium | 200 | 0.46 | ppm | EPA 6010C |
| Total Zinc | 140 | 0.50 | ppm | EPA 6010C |
| Total Thallium | 2.8 | 0.75 | ppm | EPA 7841 |
| Mercury | 47 | 0.22 | ppm | EPA 7470A |
| Sulfur—Dry Basis | 3.27 | 0.001 | % | |
| Total Antimony | 9.2 | 0.41 | ppm | EPA 7041 |

MDL = Minimum Detectable Limit

TABLE 2

| Parameter | Result | MDL | Units | Analysis Method |
|---|---|---|---|---|
| Dissolved Aluminum | 230 | 0.078 | ppm | EPA 6010C |
| Dissolved Antimony | 0.038 | 0.00099 | ppm | EPA 7041 |
| Dissolved Arsenic | 0.64 | 0.0016 | ppm | EPA 7060A |
| Dissolved Barium | 0.087 | 0.0018 | ppm | EPA 6010C |
| Dissolved Beryllium | 0.087 | 0.000048 | ppm | EPA 7091 |
| Dissolved Boron | 12 | 0.0046 | ppm | EPA 6010C |
| Dissolved Cadmium | 0.024 | 0.00049 | ppm | EPA 7131A |
| Chloride | 0.68 | 0.0125 | ppm | EPA 300.0 |
| Dissolved Chromium | 0.16 | 0.0034 | ppm | EPA 6010C |
| Dissolved Copper | 1.2 | 0.0028 | Ppm | EPA 6010C |
| Dissolved Iron | 0.48 | 0.0022 | ppm | EPA 6010C |
| Dissolved Lead | 0.0017 | 0.00054 | ppm | EPA 7421 |
| Dissolved Manganese | 3.6 | 0.00044 | ppm | EPA 6010C |
| Dissolved Molybdenum | 0.072 | 0.017 | ppm | EPA 6010C |
| Dissolved Nickel | 0.64 | 0.0096 | ppm | EPA 6010C |
| Nitrate-Nitrite as N | Less than | 0.04 | ppm | EPA 300.0 |
| Dissolved Selenium | 7.1 | 1.6 | ppm | EPA 7740 |
| Dissolved Silver | 0.00056 | 0.000062 | ppm | EPA 7761 |
| Sulfate | 3300 | 5.0 | ppm | EPA 300.0 |
| Dissolved Thallium | 0.0026 | 0.0015 | ppm | EPA 7841 |
| Dissolved Vanadium | 0.62 | 0.0062 | ppm | EPA 6010C |
| Dissolved Zinc | 1.5 | 0.0068 | ppm | EPA 6010C |
| Mercury | Less than | 1.5 | ppt | EPA 245.7 |

MDL = Minimum Detectable Limit

TABLE 3

| Chemical Composition | % | % | ASTM C 618-03 Specifications | |
|---|---|---|---|---|
| | | | Class F | Class C |
| Total Silica, Aluminum, Iron | 55.2 | | 70.0 Min | 50.0 Min |
| Silicon Dioxide | | 30.1 | | |
| Aluminum Oxide | | 18.3 | | |
| Iron Oxide | | 6.8 | | |
| Sulfur Trioxide | 2.3 | | 5.0 Max | 5.0 Max |
| Calcium Oxide | 4.0 | | | |
| Moisture Content | 1.7 | | 3.0 Max | 3.0 Max |
| Loss on Ignition | 32.3 | | 6.0 Max | 6.0 Max |

TABLE 4

| Physical Test Results | % | ASTM C 618-03 Specifications | |
|---|---|---|---|
| | | Class F | Class C |
| Fineness, Retained on #325 Sieve (%) | 7.1 | 34 Max | 34 Max |
| Strength Activity Index (%) | | | |
| Ratio to Control @ 7 days | 76.9 | | |
| Ratio to Control @ 28 days | 88.4 | 75 Min | 75 Min |
| Water Requirement, % of Control | 111.6 | 105 Max | 105 Max |
| Soundness, Autoclave Expansion (%) | | 0.8 Max | 0.8 Max |
| Density | 2.28 | | |

All CLSM ingredients and concrete ingredients were manually weighed and mixed by hand in a mixing bowl. For the fresh CLSM and concrete, an estimate was made of the unit weight for determination of the approximate mixture proportions, and a general visual observation of the workability was made.

One 3 inch by 6 inch test cylinder was cast from each mixture. The cylinders produced were not subject to any moist curing. The cylinders were air-cured in the laboratory at 70° F.±5° F. until the time of testing. Curing the cylinders in the air was intended to produce a lower value of resistance of the CLSM and concrete. Tables 5 and 6 summarize the data obtained.

TABLE 5

Mixture Proportions

| | Mixture Type | |
|---|---|---|
| | Concrete | CLSM |
| Cement, C (lb/yd³) | 474 (13.13 wt %) | 46 (1.46 wt %) |
| Class C Fly Ash, FA₁ (lb/yd³) | 190 (5.27 wt %) | 46 (1.46 wt %) |
| Particulate Matter Having Fly Ash & Spent Carbon Sorbent, SC₁ (lb/yd³) | 285 (7.90 wt %) | 640 (20.26 wt %) |
| Water (lb/yd³) | 520 (14.41 wt %) | 692 (21.91 wt %) |
| [W/(C + FA₁ + SC₁)] | 0.55 | 0.94 |
| Carbon Fibers (lb/yd³) | 4.7 (0.13 wt %) | 4.5 (0.14 wt %) |
| Sand SSD (lb/yd³) | 950 (26.33 wt %) | 1730 (54.77 wt %) |
| ⅜-in. Aggregate, SSD (lb/yd³) | 1185 (32.84 wt %) | 0 |
| Fresh Density (lb/ft³) | 133.6 | 116.8 |

The weight percents in Table 5 are the percent of the total mixture.

TABLE 6

Test Results

| | Mixture Type | |
|---|---|---|
| | Concrete | CLSM |
| Electrical Resistance (ohms) (1) | 69.6 | 95.9 |
| Electrical Resistivity (ohm-cm) (2) | 208 | 286 |
| Compressive Strength (3) | 3070 psi (21.17 MPa) | 50 psi (0.345 MPa) |

With reference to Table 6: (1) The cylinders were tested for electrical resistance at the age of 39 days. Resistance of the mixtures were measured across the 6 inch length of a 3 inch×6 inch sample (using copper plates, 3-in. diameter on each end). (2) The electrical resistivity was calculated from the measured resistance. (3) The cylinders were also tested for compressive strength at the age of 50 days (compressive strength of concrete per ASTM C 39 and ASTM per ASTM D 4832).

Therefore, it can be seen that the invention provides a means to increase the electrical conductivity of concrete or controlled low-strength materials. Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A composition capable of setting to produce a concrete, the composition comprising:
   from about 1% to about 30% by weight of portland cement;
   from about 20% to about 90% by weight of an aggregate comprising coarse aggregate and fine aggregate;
   from about 1% to about 30% by weight of fly ash;
   from 1% to about 30% by weight of particulate matter including activated carbon sorbent and a contaminant absorbed, adsorbed or entrapped by the sorbent wherein the contaminant is mercury or a compound containing mercury; and
   water in a sufficient amount such that the composition sets to a concrete having a compressive strength of at least 8.3 MPa,
   wherein all weight percentages are percent by weight of the total composition.

2. The composition of claim 1 wherein:
   the particulate matter has a carbon content as measured by loss on ignition of 20% or more.

3. The composition of claim 1 wherein:
   the composition sets to a concrete having an electrical resistivity of not more than about 10,000 ohm-centimeters.

4. The composition of claim 1 wherein:
   the composition sets to a concrete having an electrical resistivity of not more than about 1,000 ohm-centimeters.

5. The composition of claim 1 comprising:
   from about 1% to about 20% by weight of portland cement;
   from about 1% to about 20% by weight of an amount of fly ash having a carbon content as measured by loss on ignition of 6% or less;
   from about 40% to about 70% by weight of aggregate comprising coarse aggregate and fine aggregate; and
   from 1% to about 15% by weight of particulate matter including activated carbon sorbent and a contaminant absorbed, adsorbed or entrapped by the sorbent wherein the contaminant is mercury or a compound containing mercury.

6. The composition of claim 1 comprising:
   from about 5% to about 30% by weight of fly ash having a carbon content as measured by loss on ignition of 6% or less.

7. The composition of claim 1 further comprising:
   from about 0.05% to about 10% by weight of carbon fibers.

8. The composition of claim 1 wherein:
   the coarse aggregate is selected from gravel, granite, limestone, and shale.

9. The composition of claim 1 wherein:
   the fine aggregate is sand.

10. The composition of claim 1 wherein:
    mercury is present in the particulate matter at a level equal to or greater than 2 parts per million by weight.

11. The composition of claim 1 wherein:
    the fine aggregate comprises particles less than about 0.375 inches in size.

12. A self-compacting, cementitious flowable fill composition comprising:
    from about 1% to about 30% by weight of portland cement;
    from about 20% to about 90% by weight of fine aggregate;
    from about 1% to about 30% by weight of fly ash;
    from 1% to about 30% by weight of particulate matter including activated carbon sorbent and a contaminant absorbed, adsorbed or entrapped by the sorbent wherein the contaminant is mercury or a compound containing mercury; and
    water in a sufficient amount such that the composition sets to a material having a compressive strength of 8.3 MPa or less,
    wherein all weight percentages are percent by weight of the total composition.

13. The composition of claim 12 wherein:
    the fly ash has a carbon content as measured by loss on ignition of 6% or less.

14. The composition of claim 12 wherein:
the composition sets to a material having a compressive strength of 2.1 MPa or less.

15. The composition of claim 12 wherein:
the composition sets to a material having an electrical resistivity of not more than about 6000 ohm-centimeters.

16. The composition of claim 12 wherein:
the composition sets to a material having an electrical resistivity of not more than about 1000 ohm-centimeters.

17. The composition of claim 12 wherein:
the particulate matter has a carbon content as measured by loss on ignition of 20% or more.

18. The composition of claim 12 wherein:
the fine aggregate is sand.

19. The composition of claim 12 wherein:
the fine aggregate is about 20% to about 65% by weight.

20. The composition of claim 12 wherein:
mercury is present in the particulate matter at a level equal to or greater than 2 parts per million by weight.

21. The composition of claim 12 wherein:
the fine aggregate comprises particles less than about 0.375 inches in size.

22. The composition of claim 12 further comprising:
from about 0.05% to about 10% by weight of carbon fibers.

* * * * *

UNITED STATES PATENT AND TRADEMARK OFFICE
CERTIFICATE OF CORRECTION

PATENT NO. : 7,578,881 B2
APPLICATION NO. : 11/402452
DATED : August 25, 2009
INVENTOR(S) : Bruce W. Ramme Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 758 days.

Signed and Sealed this

Seventh Day of September, 2010

David J. Kappos
*Director of the United States Patent and Trademark Office*